United States Patent [19]

Moore et al.

[11] 3,917,475

[45] Nov. 4, 1975

[54] LIQUID FERTILIZER COMPOSITION AND PROCESS

[75] Inventors: William Percy Moore, Hopewell, Va.; John Harvey Agee, Baton Rouge, La.

[73] Assignee: Allied Chemical Corporation, New York, N.Y.

[22] Filed: Apr. 12, 1974

[21] Appl. No.: 460,318

[52] U.S. Cl. .................................... 71/34; 71/64 C
[51] Int. Cl.² ............................................ C05B 1/00
[58] Field of Search ......... 71/34, 43, 64 C; 423/305

[56] References Cited
UNITED STATES PATENTS

| | | | |
|---|---|---|---|
| 3,464,808 | 9/1969 | Kearns | 71/34 |
| 3,492,087 | 1/1970 | MacGregor et al. | 423/305 |
| 3,649,175 | 3/1972 | Legal | 423/305 |
| 3,695,835 | 10/1972 | Kearns | 423/310 |

*Primary Examiner*—Charles N. Hart
*Attorney, Agent, or Firm*—Fred L. Kelly

[57] ABSTRACT

An ammonium phosphate fertilizer solution having 20 to 40 percent of the $P_2O_5$ content thereof in the form of polyphosphates is prepared by reacting wet-process phosphoric acid directly with ammonia at 425°–460°F. to produce a low-nonortho ammonium phosphate melt which is then further reacted with aqueous ammonia. Desirably, heat exchange is utilized to conserve energy normally wasted in processes utilizing direct ammoniation of phosphoric acid. The resulting solution must be filtered to remove non-chelated metal impurities. The product solution contains phosphate in essentially only the stable pyrophosphate and orthophosphate forms, whereby the chelating ability of the solution is retained for long storage periods.

3 Claims, No Drawings

3,917,475

LIQUID FERTILIZER COMPOSITION AND PROCESS

BACKGROUND OF THE INVENTION

This invention relates to the production of ammonium phosphate solutions. More particularly, it relates to the production of stable ammonium phosphate fertilizer solutions by the direct ammoniation of concentrated phosphoric acid derived from wet-process acid. Wet-process phosphoric acid is produced by decomposing phosphate rock, particularly calcium phosphate, with sulfuric acid and separating the phosphoric acid from the precipitated calcium sulfate. The resulting crude phosphoric acid contains various amounts of impurities such as iron, aluminum, calcium, magnesium and other metals in the form of their phosphates, sulfates or fluorides, depending on the characteristics of the particular phosphate rock which is used as a starting material. Because of the simplicity and cheapness of its manufacture, wet-process phosphoric acid is regarded as an excellent source of fertilizer grade phosphates. However, because of the presence of the aforementioned impurities its use is fraught with many difficulties and complications. As is well known, when wet-process phosphoric acid is treated with ammonia to form aqueous ammonium phosphate solutions, the impurities present in the acid form gelatinous precipitates which are extremely difficult to separate from the aqueous phase by filtration or other conventional methods. These precipitates form large deposits in the equipment used for storage and transfer and make handling difficult. The prior art discloses several attempts to overcome this difficulty. The use of sequestering agents, such as sodium hexametaphosphate, has proved unsatisfactory. Other methods involve heat treatment under controlled conditions to form various compounds which retain the metal impurities in solution, but such methods have the disadvantage of tieing up substantial amounts of polyphosphate. For example, it has been found that when more than about 2% of $Al_2O_3$ and $Fe_2O_3$ are present, the availability of the phosphate is substantially reduced due to the formation of iron and aluminum pyrophosphates. Still another prior art method for overcoming the aforementioned problem comprises neutralizing the crude phosphoric acid at elevated pressure and temperature to cause the metal compounds to precipitate in a form which is readily filtered from the resulting polyphosphate solution. This process has the disadvantage of requiring pressure resistant equipment which adds to the cost.

U.S. Pat. No. 3,464,808 relates to manufacture of ammonium polyphosphates from wet process phosphoric acid. Phosphoric acid having $P_2O_5$ content of between about 55 and 65% is reacted with ammonia under conditions that simultaneously neutralize and molecularly dehydrate the acid whereby at least 20% of the orthophosphate is converted to non-orthophosphate (polyphosphate) and the resulting ammonium polyphosphate possesses self-sequesteringn properties. The patent features supplying a stream of ammonia to a jet reactor, supplying a stream of concentrated phosphoric acid to said jet reactor, and contacting said ammonia and said acid in said reactor at temperatures of 450°F. to 650°F. for a period of less than one second to form molten droplets of ammonium polyphosphate. The molten product is subsequently quenched, e.g., by dissolving it in an aqueous system and further neutralizing the reaction product. Unfortunately, the aqueous ammonium polyphosphate product of this patent is not very stable in storage. Moreover, the molten reaction mixture is very corrosive to metal equipment at the higher reaction temperatures required for maximum polyphosphate production.

U.S. Pat. No. 3,492,087 to Moore et al. discloses a process wherein relatively pure ammonium polyphosphate fertilizer solution is prepared by introducing preheated ammonia into wet process phosphoric acid and heating the mixture to at least 205°C. to produce an anhydrous molten mass which is then dissolved in an aqueous medium. Filterable solids are separated to produce a clear ammonium polyphosphate solution. The ammoniation is preferably conducted in two stages, wherein preheated anhydrous ammonia is introduced into the second stage and the unabsorbed ammonia therefrom is used to partially neutralize the acid in the first stage.

Although the disclosure of U.S. Pat. No. 3,492,087 is an important contribution to this art, research studies have been continued in an effort to develop an improved process which would obviate the remaining problems of direct ammoniation technology, namely, gradual formation of relatively large quantities of insoluble metal compounds during storage, severe corrosion of the reactor, and the conservation of energy normally wasted in prior art processes utilizing direct ammoniation of phosphoric acid.

SUMMARY OF THE INVENTION

In view of the foregoing, it is an object of the present invention to provide an improved process for producing ammonium phosphate fertilizer solutions from wet-process phosphoric acid.

It is a further object of the present invention to provide an economical process for producing a liquid nitrogen-phosphate fertilizer from wet-process phosphoric acid and ammonia wherein the amount of heat provided to the process is greatly reduced.

Another object of the invention is to provide an improved process for producing a stable ammonium phosphate solution having 20 to 40 percent of the $P_2O_5$ content in the form of pyrophosphate.

These and other objects and advantages which will be obvious hereinafter are achieved by the present invention which is set forth in the following description wherein parts and percentages are by weight.

The present invention relates to a process for production of an ammonium phosphate fertilizer solution, which comprises the following steps:

a. providing a concentrated wet-process phosphoric acid containing about 55–65% $P_2O_5$;

b. continuously reacting said concentrated acid with substantially anhydrous ammonia at a temperature of 425°–460°F. for at least 5 seconds, preferably 5–60 seconds, sufficient ammonia being reacted with the acid to produce a reaction melt having a nitrogen to $P_2O_5$ weight ratio between about 0.12 and 0.29, whereby the polyphosphate content of the melt is increased to about 20–40% of the total $P_2O_5$;

c. continuously quenching the resulting reaction melt in aqueous ammonia of sufficient concentration to form a solution containing 10-13% nitrogen and 33–37% $P_2O_5$ having 20–40% of the total $P_2O_5$ in polyphosphate form, said solution containing filterable solids; and d. separating the solids and recovering a clear solution consisting essentially of ammonium orthophosphate and ammonium pyrophosphate, which solution remains substantially free from precipitated solids for at least 90 days at normal storage temperatures.

We have discovered that the above-described process can be further improved both from the standpoint of conservation of energy and corrosion of metal equipment used in the process, by the following modifications:

1. preheating the concentrated wetprocess phosphoric acid utilized in step (b) in a heat exchanger to a temperature of 200°–290°F., preferably 240°–275°F;

2. further preheating said concentrated wet-process phosphoric acid to a temperature of about 300°–400°F. by indirectly contacting the acid with the hot reaction melt in step (b) in a heat exchanger;

3. preheating the substantially anhydrous ammonia utilized in step (b) in a heat exchanger to a temperature of 200°–290°F., preferably 240°–275°F., and 4. further preheating said ammonia to a temperature of 300°–400°F. by indirectly contacting the ammonia with the hot reaction melt in step (b) in a heat exchanger.

The concentrated wet-process phosphoric acid utilized in the process of the present invention can be obtained by evaporating commercial wet-process phosphoric acid. Such acid usually contains about 0.8 to 1.8% iron, 0.6 to 1.3% aluminum, 0.2 to 0.5% magnesium, 0.04 to 0.4% calcium, 0.04 to 0.1% potassium and 0.03 to 0.1% sodium, analyzed in the form of the respective oxides. However, some of the metal cations may be removed prior to use by any suitable means such as ion exchange. Alternatively, if desired, the acid utilized in the process can consist of a simple mixture of commercial wet-process phosphoric acid and superphosphoric acid, which is the term usually applied to phosphoric acid that contains around 70 to 76% $P_2O_5$ comprising ortho- and polyphosphoric acids. From an economic viewpoint, it is generally preferable to utilize a concentrated wet-process phosphoric acid containing little or no added superphosphoric acid.

The ammonia feed for the process is desirably anhydrous ammonia; however, a small proportion of water can be tolerated in the ammonia if the wetprocess phosphoric acid utilized in the process is highly concentrated.

The pressure under which the reaction mixture is heated should be sufficiently low to allow vaporization of water present in the acid as well as that which is split off during the formation of the polyphosphate. Pressures of 0.5 to 5 atmospheres are advantageously used, thus permitting the use of less costly equipment.

A reaction temperature of 425° to 460°F. is utilized for the polyphosphate formation. A reaction time of at least 5 seconds, preferably 5 to 60 seconds, is required for adequate reaction. Surprisingly, the iron and aluminum impurities in the acid are partly chelated. This is particularly unexpected in view of U.S. Pat. No. 2,415,797 which teaches that the metallic impurities of iron and aluminum precipitate out of wet-process phosphoric acid when it is heated to temperatures of 300°C. (572°F.). It may be theorized that the pyrophosphate rapidly produced in the instant process forms chelates with the iron and aluminum which are stable throughout the process.

The heating is continued until a substantially anhydrous melt is obtained wherein about 20 to 40% of the $P_2O_5$ is present as polyphosphate. Prolonged heating should be avoided to avoid possible formation of higher polyphosphates which are not as stable to hydrolysis as the pyrophosphate. Generally, the reaction is complete within 60 seconds. A reactor designed for plug flow is utilized.

As indicated hereinabove, sufficient ammonia is reacted with the phosphoric acid in the high temperature reactor to produce an ammonium phosphate melt having a nitrogen to $P_2O_5$ weight ratio between about 0.12 and 0.29. Preferably, the melt contains about 9–11% nitrogen and about 60–63% $P_2O_5$.

The ammonium phosphate melt is quenched directly in aqueous ammonia. The preferred solvent is aqueous ammonia of sufficient concentration to produce a solution containing about 10 to 13% nitrogen and 33 to 37% $P_2O_5$. Temperature during quenching is preferably maintained at about 75° to 212°F.

The aqueous solution formed as above contains up to 4% filterable solids in fine granular form and composed largely of calcium and magnesium complexes of ammonium phosphates, and has a pH of about 5.5 to 6.5. This solution is preferably fed directly to a filter or centrifuge for solids removal. The equipment used can be that conventionally employed in the art for the separation of solids from liquids, for example a leaf filter, a rotary filter or a perforated bowl type centrifuge. Surprisingly, no filtration problems are encountered.

The liquid ammonium polyphosphate product of this process has particular value in the fertilization of crops because of its ability to supply easily dispensed primary nutrients as well as trace amounts of micronutrients, particularly iron in chelated form. Such solutions will remain stable, i.e., substantially free from precipitated solids for at least 90 days at normal storage temperatures. Preferred solutions have a nitrogen content of about 10 to 13%, a $P_2O_5$ content of about 33 to 37% and a pH in the range 5.5 to 6.5.

To obtain optimum conversion of the $P_2O_5$ to pyrophosphate, it is necessary to preheat the reactants prior to reaction; the ammonia is preheated to a temperature of 300°–400°F., and the concentrated wet-process phosphoric acid is preheated to a temperature of 300°–400°F. Part of this heat is obtained by heat exchange with the hot reaction, melt, and this heat exchange has the added advantage of maintaining the temperature of the reaction mixture at 425°–460°F., which is the desired reaction temperature. Moreover, this heat exchange with the reactants effectively reduces the "skin" temperature of the interior walls of the reactor thereby significantly reducing corrosion of the reactor equipment.

It has been found that satisfactory heat exchange and the desired reaction temperature of 425°–460°F. are readily obtained if the reactant phosphoric acid concentration is 55–65% $P_2O_5$, and the reactants are preheated as described in the previous paragraph. If the phosphoric acid concentration in the feed is less than 55% $P_2O_5$, the required minimum temperature of 425°F. in the reactor will not be reached because of the consumption of relatively large amounts of heat to evaporate excess water in the phosphoric acid.

DESCRIPTION OF THE PREFERRED EMBODIMENT

In order to demonstrate the invention, the following examples are given:

EXAMPLE 1

Wet-process orthophosphoric acid containing 50.3% $P_2O_5$ is preheated to 265°F. and fed to a conventional stainless steel falling film evaporator to form a concentrated phosphoric acid containing about 60.0% $P_2O_5$. A typical sample of this concentrated wet-process phosphoric acid having the following properties, which will hereinafter be referred to as "Solution A", is found to be useful for purposes of the present invention:

| | |
|---|---|
| Total $P_2O_5$, % | 60.0 |
| Percent of Total $P_2O_5$ as | |
| Polyphosphate | 0.0 |
| $Fe_2O_3$, % | 0.8 |
| $Al_2O_3$, % | 0.7 |
| MgO, % | 0.4 |
| CaO, % | 0.1 |
| $SO_4$, % | 4.2 |

Small proportions of sulfate ion are found to be effective as a corrosion inhibitor in the presence of polyphosphate. Accordingly, to minimize corrosion of evaporator tubes, the wet-process orthophosphoric acid is fed into a recycle stream of the concentrated acid. Desirably, the acid contains 2–10% sulfate ion.

Solution A, the above-described concentrated wet-process phosphoric acid, is continuously pumped at 1,000 pounds per hour through a conventional steam heated "Karbate" heat exchanger, operating at 50 psig steam pressure on the shell side, where it is heated to 275°F. The acid is then further preheated to about 380°F. by passing it through a heat exchanger which is indirectly heated by the hot reaction melt with use of Dowtherm as described hereinafter.

The anhydrous ammonia to be reacted with the concentrated wet-process phosphoric acid is vaporized and heated to about 275°F. in a conventional steel steam-heated exchanger. About 200 pounds per hour of ammonia is fed to said heat exchanger. The ammonia is then further preheated to about 380°F. by passing it through a heat exchanger which is indirectly heated by the hot reaction melt with use of Dowtherm as described hereinafter.

The exothermic direct reaction of the preheated ammonia and phosphoric acid is carried out in a heat exchanger which for convenience is called the Direct Process Reactor. The Direct Process Reactor is about eleven feet in height; it consists essentially of a 2-inch diameter stainless steel reactor tube having lateral fins and a 4-inch diameter jacket for heat exchange with Dowtherm. Dowtherm is an eutectic mixture of phenyl ether and diphenyl conventionally used for heat exchange purposes. Heat exchange enables temperatures to be closely controlled at about 430°F. in the reaction melt. The Dowtherm in the jacket of the Direct Process Reactor is continuously circulated by pumping to the above-described ammonia and phosphoric acid preheaters where the ammonia and phosphoric acid streams are heated to about 380°F. by heat exchange utilizing the heat extracted from the hot reaction melt.

The Direct Process Reactor is arranged in a vertical position, and the preheated ammonia and acid (at about 380°F.) are fed tangentially in the bottom. Sufficient ammonia is fed to the Direct Process Reactor and reacted with the acid to form a partially ammoniated phosphate melt containing 9–11% nitrogen and 60–63% $P_2O_5$ within 5 to 15 seconds. The temperature of the reaction mixture rises to about 430°F. and a melt is formed as the mixture passes upwardly through the reactor. As previously indicated, the circulating Dowtherm is heated to about 400°F. in the jacket portion of the Direct Process Reactor.

The reaction melt passes from the top of the Direct Process Reactor at a pressure of about 1 atmosphere and is discharged through a downturned end of a horizontal pipe into the middle section of a conventional absorption tower called the Product Absorber. Composition of the 987 pounds per hour of melt discharged from the Direct Process Reactor is as follows:

| Component | Weight % |
|---|---|
| $P_2O_5$ | 61 |
| Pyrophosphate (% of total $P_2O_5$) | 32 |
| Higher polyphosphates | 0 |
| MgO | 0.38 |
| $Fe_2O_3$ | 0.76 |
| $Al_2O_3$ | 0.65 |
| $SO_4$ | 4.12 |
| N | 10.6 |

The partially ammoniated phosphate melt from the Direct Process Reactor at about 430°F. blows downward into the Product Absorber where it is injected into a cooled reservoir of recycling aqueous ammonium phosphate fertilizer solution together with sufficient ammonia and water to form the product solution containing about 10–13% nitrogen and 33–37% $P_2O_5$, by weight, said solution having about 20–40% of the total $P_2O_5$ in polyphosphate form. The upper part of the Product Absorber contains conventional polypropylene packing, and the aqueous ammonium phosphate solution is cooled and recycled downward through the Product Absorber. Water vapor and unreacted ammonia discharged into the Product Absorber are absorbed by the circulating cooled aqueous ammonium phosphate solution. Product solution is withdrawn from the Product Absorber in amount equivalent to the reactants fed to the process. The plant typically produces a 10-34-0 fertilizer solution, sufficient water and ammonia being added to the circulating solution to give the desired composition and adjust product pH to about 6. Temperature of the circulating solution is maintained at a temperature no higher than 140°F. by means of coolers.

Product is held for about 2 hours in the absorber reservoir before it is discharged by pumping through a pressure bag filter and chiller for storage at ambient temperature in carbon steel storage tanks. About 3 percent by weight of the total $P_2O_5$ in the product is removed in the filter and discharged from the system. Solids comprise iron and magnesium ammonium phosphates.

Composition of the 1,700 pounds per hour of product solution sent to storage is as follows:

| Component | Weight % |
|---|---|
| $P_2O_5$ | 34.10 |
| Pyrophosphate (% of total $P_2O_5$) | 27.00 |
| Higher phosphate species (% of total) | 0.00 |
| MgO | 0.16 |
| $Fe_2O_3$ | 0.34 |
| $Al_2O_3$ | 0.36 |
| $SO_4$ | 2.20 |
| N | 10.10 |

This solution is substantially free from precipitated solids and remains stable for at least 90 days. No technical problems are noted in operation of the process.

EXAMPLE 2

The procedure of Example 1 is followed except that the concentrated phosphoric acid (60% $P_2O_5$) utilized is prepared by blending 670 pounds per hour of a wet-process phosphoric acid containing 53% $P_2O_5$ with 330 pounds per hour of superphosphoric acid containing 74% $P_2O_5$. Essentially, the same results are obtained as in Example 1, and the 10-34-0 fertilizer solution product is substantially free from precipitated solids and remains stable for at least 90 days.

EXAMPLE 3 (Comparative)

The procedure of Example 1 is followed except that the wet-process phosphoric acid fed to the reactor contains only 54% by weight $P_2O_5$. The maximum temperature reached in the reactor is only 407°F. After 30 minutes operation, the apparatus becomes plugged completely, and it is necessary to shut down for extensive clean-out operations. When compared with results of Example 1, this example shows that the concentration of the feed acid is a critical element in the present invention. Preferably, the feed acid contains 60–65% by weight of $P_2O_5$. Desirably, the feed acid also contains small amounts, e.g., 2–5% by weight, of sulfuric acid.

DISCUSSION

The present invention provides a novel liquid nitrogen-phosphorus-sulfur fertilizer solution prepared from wet-process phosphoric acid and ammonia, which solution has improved storage properties. The composition consists essentially of a low-nonortho ammonium phosphate aqueous solution having the phosphate in essentially only the stable ortho and pyro forms, together with small amounts of ammonium sulfate. The improvement in storage properties results from reduced precipitation of alkaline earth compounds during storage, and inhibition of corrosion of steel storage vessels due to the sulfate present in the fertilizer composition.

The liquid fertilizer composition of this invention can be prepared by direct reaction of wet-process phosphoric acid with ammonia or by use of superphosphoric acid; however, the direct route is preferred on basis of economics. It is particularly important that the product of the present invention can be prepared by the direct process with a minimum expenditure of energy. Preferably, the heat of reaction is utilized to preheat the reactants.

A typical preferred product solution contains about 34% $P_2O_5$ (by weight), about 10% N, about 0.7 to 1.0% of chelated magnesium, iron and aluminum compounds, and about 2% of $(SO_4)$ ion, said solution containing 20–40% of the total $P_2O_5$, in the form of pyrophosphate.

We claim:

1. In a process for production of an ammonium phosphate fertilizer solution which comprises the following steps:
    a. providing a concentrated wet-process phosphoric acid containing 60–65% $P_2O_5$;
    b. continuously reacting said concentrated acid with substantially anhydrous ammonia at a temperature of 425°–460°F. for 5–60 seconds, sufficient ammonia being reacted with the acid to produce a reaction melt having a nitrogen to $P_2O_5$ weight ratio between about 0.12 and 0.29, whereby the polyphosphate content of the melt is increased to 20–40% of the total $P_2O_5$;
    c. continuously quenching the resulting reaction melt in aqueous ammonia of sufficient concentration to form a clear solution containing 10–13% nitrogen and 33–37% $P_2O_5$ having 20–40% of the total $P_2O_5$ in polyphosphate form, said solution containing filterable solids; and
    d. separating the solids to recover a clear solution consisting essentially of ammonium orthophosphate and ammonium pyrophosphate, which solution remains substantially free from precipitated solids for at least 90 days at normal temperatures; the improvement comprising:
    1. preheating the concentrated wet-process phosphoric acid utilized in step (b) in a conventional steam-heated heat exchanger to a temperature of 240°–275°F.;
    2. further preheating said concentrated wet-process phosphoric acid to a temperature of 300°–400°F. by indirectly heating the acid with the hot reaction melt in step (b) in a heat exchanger using a circulating liquid heat exchange medium;
    3. preheating the substantially anhydrous ammonia utilized in step (b) in a conventional steamheated heat exchanger to a temperature of 240°–275°F.; and
    4. further preheating said ammonia to a temperature of 300°–400°F. by indirectly heating the ammonia with the hot reaction melt in step (b) in a heat exchanger using a circulating liquid heat exchange medium.

2. The process of claim 1 wherein the concentrated wet-process phosphoric acid contains 2–10% sulfate ion as a corrosion inhibitor.

3. The process of claim 1 wherein the reaction mixture in step (b) is maintained in plug flow in an elongated tubular reactor.

* * * * *